US010337593B2

(12) United States Patent
Medina et al.

(10) Patent No.: US 10,337,593 B2
(45) Date of Patent: Jul. 2, 2019

(54) LOWER ATTACHMENT FOR TRIMMABLE HORIZONTAL STABILISER ACTUATOR (71) Applicant: Goodrich Actuation Systems SAS, Buc (FR)

(72) Inventors: Raphael Medina, Ecouen (FR); Anh-Vu Abdul-Bari, Franconville (FR)

(73) Assignee: GOODRICH ACTUATION SYSTEMS SAS, Buc (FR)

(*) Notice: Subject to any disclaimer, the term of this patent is extended or adjusted under 35 U.S.C. 154(b) by 596 days.

(21) Appl. No.: 15/080,791

(22) Filed: Mar. 25, 2016

(65) Prior Publication Data
US 2016/0281826 A1    Sep. 29, 2016

(30) Foreign Application Priority Data

Mar. 27, 2015 (EP) ..................................... 15305450

(51) Int. Cl.
F16H 25/20 (2006.01)
B64C 13/28 (2006.01)
F16H 25/24 (2006.01)
B64C 5/10 (2006.01)
F16H 25/22 (2006.01)

(52) U.S. Cl.
CPC .......... F16H 25/2025 (2013.01); B64C 5/10 (2013.01); B64C 13/28 (2013.01); F16H 25/205 (2013.01); F16H 25/2204 (2013.01); F16H 25/2454 (2013.01); F16H 25/2472 (2013.01)

(58) Field of Classification Search
CPC ............. F16H 25/2025; F16H 25/2454; F16H 25/2472; F16H 25/205; B64C 5/10

USPC ......................................................... 74/89.39
See application file for complete search history.

(56) References Cited

U.S. PATENT DOCUMENTS

| 2,447,439 | A | * | 8/1948 | Thompson | .......... F16H 25/2204 192/223 |
| 4,149,430 | A | * | 4/1979 | F'Geppert | ........... F16H 25/2204 477/23 |
| 5,299,853 | A | * | 4/1994 | Griswold | ............... B60N 2/233 188/DIG. 1 |
| 5,467,661 | A | * | 11/1995 | Lange | ................. F16H 25/2204 74/424.82 |
| 6,672,540 | B1 | | 1/2004 | Shaheen et al. | |
| 8,281,678 | B2 | | 10/2012 | Cavalier et al. | |

(Continued)

OTHER PUBLICATIONS

Extended European Patent Office Search Report; Application No. 15305450.7-1757; dated Sep. 10, 2015; 7 pages.

Primary Examiner — William C Joyce
(74) Attorney, Agent, or Firm — Cantor Colburn LLP (57) ABSTRACT A lower attachment system for a trimmable horizontal stabilizer actuator (THSA) includes a screwshaft forming a part of or coupled to a main screw of the actuator, the screwshaft having an axial direction and a primary ballnut disposed on the screwshaft and forming a part of a primary load path of the lower attachment system. The THSA also includes a lower secondary nut and an upper secondary nut as well as a secondary connection arranged for axial and rotational movement and coupled to each of the lower secondary nut and the upper secondary nut. The secondary connection is arranged to be loaded when the secondary load path is loaded and the secondary load path also includes the upper and lower secondary nuts.

11 Claims, 4 Drawing Sheets

(56) References Cited

U.S. PATENT DOCUMENTS

| | | | |
|---|---|---|---|
| 8,291,782 B1* | 10/2012 | Shaheen | F16H 25/2454 74/89.23 |
| 8,596,154 B2 | 12/2013 | Cavalier et al. | |
| 8,702,034 B2 | 4/2014 | Moulon et al. | |
| 2003/0029258 A1 | 2/2003 | Davies et al. | |
| 2004/0200929 A1 | 10/2004 | Federico et al. | |
| 2013/0105623 A1 | 5/2013 | Moulon et al. | |

* cited by examiner

Fig. 1

PRIOR ART

LOWER ATTACHMENT FOR TRIMMABLE HORIZONTAL STABILISER ACTUATOR

FOREIGN PRIORITY

This application claims priority to European Patent Application No. 15305450.7 filed 27 Mar. 2015, the entire contents of which is incorporated herein by reference.

TECHNICAL FIELD

The invention relates to a lower attachment for a flight actuator such as a trimmable horizontal stabiliser actuator. In particular, it relates to adaptations to elements for use in a secondary load path of the lower attachment for an actuator that has a primary load path and a secondary load path.

BACKGROUND OF THE INVENTION

Figure 1:
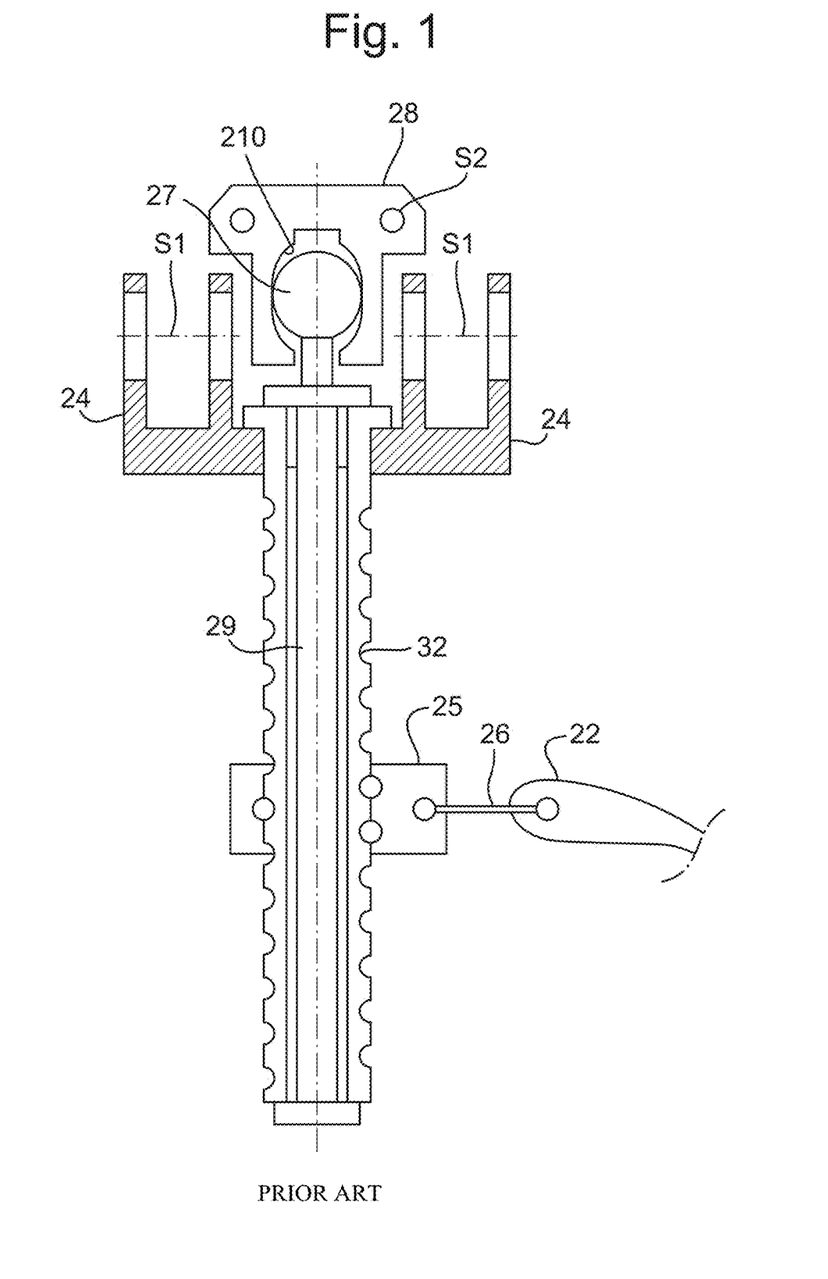
FIG. 1 discloses a prior art flight actuator.

It is well known for flight actuator to include two mechanical load paths, one primary and the other secondary, with the latter intended to take up the load when the primary path has failed. In a typical prior art device, as shown in FIG. 1, when operating on the primary load path the loads are transmitted through a hollow ball or roller screw. The hollow screw houses a safety rod, also called a failsafe bar or tie bar, which is connected to the screw with a small amount of play. During normal operation of the screw, when the primary load path is working correctly, the secondary load path formed by this tie bar carries no load since there is no contact due to the small amount of play. However, in the event of a failure of the screw in the primary load path then the tie bar performs its failsafe function and ensures continuity of the transmission of loads by the actuator.

With reference to FIG. 1 a typical known flight control actuator of the trimmable horizontal stabiliser actuator (THSA) type includes a primary load path with a hollow screw 32 connected at its upper end to the aircraft via a Cardan joint system 24 joining with first aircraft structural elements S1. The primary load path further includes a nut assembly 25 mounted on the screw 33, and the nut assembly 25 is connected to the stabiliser 22 of the aircraft, this connection being achieved for example by another Cardan joint system 26.

As mentioned above, the secondary load path is provided by means of a tie bar 29 which is within the screw 32. The tie bar 29 is terminated at its upper end by a male portion, in this case taking the form of a spherical head 27, which is mounted within a female portion on a fastening piece 28, in this case taking the form of a recess 210. The fastening piece 28 is connected to the structure of the aircraft via second aircraft structural elements S2. The known system may also include some means for preventing motion of the nut assembly 25 relative to the screw 32 and/or for fixing the stabiliser 22/Cardan joint 26 in place when the primary load path fails. Thus, the lower attachment, of which the nut assembly 25 is a part, could also include secondary load path elements used when the primary load path fails.

In the example known upper attachment shown in FIG. 1 it will be understood that should the screw 32 fail then load can be carried by the secondary load path since movement of the spherical head 27 is restricted by the upper and lower shoulders of the recess 210. Consequently, the stabiliser 22 can either be safely held in a single position (in the case where the lower attachment locks in place) or in some prior art arrangements it might be permitted to continue normal movement should the tie bar 29 be connected with the ballscrew 23 in such a way as to permit continued rotation of the screw 23 even after failure preventing it from carrying axial loads.

A flight actuator with the basic features discussed above can be found in the prior art, for example in U.S. Pat. No. 8,702,034 and in US 2013/105623.

SUMMARY

Viewed from a first aspect the present invention provides a lower attachment system for a trimmable horizontal stabiliser actuator comprising: a screwshaft forming a part of or coupled to a main screw of the actuator, the screwshaft having an axial direction; a primary ballnut disposed on the screwshaft and forming a part of a primary load path of the lower attachment system; a lower secondary nut disposed on the screwshaft axially adjacent the primary ballnut; an upper secondary nut disposed on the screwshaft adjacent the lower secondary nut and on the opposite side thereof to the primary ballnut and a secondary connection arranged for axial and rotational movement and coupled to each of the lower secondary nut and the upper secondary nut; wherein the secondary connection is arranged to be loaded when the secondary load path is loaded and the secondary load path also includes the upper and lower secondary nuts; and wherein the couplings between the secondary connection and the upper and lower secondary nuts are arranged such that during normal use, when the primary ballnut transmits the loading of the actuator along the primary load path, then there is no relative rotational movement of the secondary connection, the upper secondary nut and the lower secondary nut, and such that when the secondary connection is subject to an axial load resulting from load being transferred to the secondary load path the upper secondary nut and lower secondary nut are compelled to rotate relative to one another thereby locking the threads of the secondary nuts with the screwshaft.

With this arrangement when sufficient loading is placed on the secondary load path, i.e. when the primary load path fails, then the lower attachment will become locked to the screwshaft and further movement of the lower attachment is prevented due to the locked threads of the upper secondary nut and lower secondary nut. By locking the lower attachment it becomes possible to lock the entire actuator in place so that after a failure of the primary load path the aircraft can safely be landed.

When the upper secondary nut and the lower secondary nut move in relative rotation then their threads will become locked with the threads of the screwshaft. This is because the two nuts are restricted from moving axially relative to one another. In fact preferably no relative axial movement is permitted. It will however be appreciated that only one out of the upper secondary nut and the lower secondary nut needs to move in relative rotation compared to the secondary connection. Preferably, just one of the two nuts moves rotationally relative to the secondary connection. In this case the other nut need not move at all, which can simplify the mechanism.

The system may include a biasing mechanism disposed between the ballnut and the lower secondary nut, the biasing mechanism being arranged to hold the lower secondary nut in such a position that its threads are disposed centrally between the threads of the screwshaft when no axial load is applied to the lower secondary nut. In this case when the axial load arising from failure of the primary load path is applied to the secondary connection, then the coupling between the secondary connection and the lower secondary nut may transfer an axial load to the lower secondary nut, this axial load acting against the force applied by the biasing mechanism and hence moving the threads of the lower secondary nut so that its threads are no longer disposed centrally between the threads of the screwshaft. In some examples the threads of the lower secondary nut bear on the screwshaft threads when the axial load is transferred from the secondary connection.

The couplings between the secondary connection, the upper secondary nut and the lower secondary nut may be implemented in a number of ways and the only essential feature is that the function described above is achieved. For example, one of the upper and lower secondary nuts may be coupled to the secondary connection by surface to surface contact generating friction. This might be used when the nut in question is intended to remain immovable axially and radially relative to the secondary connection. One of the upper and lower secondary nuts may be coupled to the secondary connection by a mechanism that prevents relative rotational movement when no axial load is applied to the secondary connection, but permits relative rotational movement when an axial load is applied to the secondary connection, in particular an axial load above a threshold level.

In an example implementation for the couplings one of the secondary nuts, preferably the upper secondary nut, is coupled to the secondary connection via a piston constrained within a slot and held in position in the slot by a ramp; wherein the slot is shaped such that when the piston is able to pass the ramp then the nut and secondary connection can move rotationally relative to one another thereby locking the threads of the two nuts with the screwshaft. The piston may be held against the ramp by a resilient device, for example a spring, such that sufficient rotational force will cause the piston to pass along the ramp, depressing the resilient device and passing beyond the ramp and further along the slot to achieve the rotational movement described above.

The slot may be formed in the surface of one of the secondary connection or the nut. The spring and optionally a part of the piston may be held within an axial bore in the other of the secondary connection or the nut. Thus, the slot and the piston are on separate sides of an interface between the secondary connection and the nut and the pin bridges the clearance so that it can interact mechanically with both the secondary connection and the nut. Preferably the interface has inner and outer circumferential surfaces of the secondary connection and the nut facing each other with a clearance in between.

The slot may have a first portion extending in the axial direction of the screwshaft with a second portion joining at an angle to an end of the first portion, the second portion extending in a circumferential direction. The circumferential extent of the second portion allows the pin to move circumferentially in the slot and this results in relative rotational movement of the secondary connection and the nut. The axial extent of the first portion enables the spring to push the pin into the end of the slot, making it impossible for reverse rotational movement to occur. The second portion may extend both circumferentially and axially, i.e. not perpendicular to the first portion, and preferably the angle is an obtuse angle, for example an angle between 90° and 135°. The ramp is preferably formed on the second portion and acts to keep the pin in the second portion until a sufficient rotational force is applied, at which point the pin will pass by the ramp and be free to move along the remainder of the second portion, to the angle and into the first portion.

There may be a thrust bearing between the upper and lower secondary nuts. This enables the two nuts to bear against each other with large compressive forces and yet still rotate relative to one another in order to jam the threads. It also permits compressive and tensile forces to be applied between the two secondary nuts in normal use without any adverse impact on the operation of the device, since in that case there will be no relative rotation and the threads of the two nuts will remain correctly oriented for rotational motion within the thread of the screw shaft.

The secondary connection may include transfer plates arranged to interact with transfer plates on the primary ballnut. This may be for transferring loads during normal use with elements of the secondary load path rotating at the same time as the primary ballnut. This and other elements of the lower attachment and actuator that are not discussed above can be implemented in a similar manner to the features of known actuators of this type.

Viewed from a second aspect, the present invention provides a method of using a lower attachment system for a trimmable horizontal stabiliser actuator to avoid backlash in a secondary load path, the lower attachment comprising: a screwshaft forming a part of or coupled to a main screw of the actuator, the screwshaft having an axial direction; a primary ballnut disposed on the screwshaft and forming a part of a primary load path of the lower attachment system; a lower secondary nut disposed on the screwshaft axially adjacent the primary ballnut; an upper secondary nut disposed on the screwshaft adjacent the lower secondary nut and on the opposite side thereof to the primary ballnut; and a secondary connection coupled to each of the lower secondary nut and the upper secondary nut; the method comprising: arranging the secondary connection for axial and rotational movement; arranging the secondary connection to be loaded when the secondary load path is loaded, wherein the secondary load path also includes the upper and lower secondary nuts; arranging the couplings between the secondary connection and the upper and lower secondary nuts such that during normal use, when the primary ballnut transmits the loading of the actuator along the primary load path, then there is no relative rotational movement of the secondary connection, the upper secondary nut and the lower secondary nut; and, when the secondary connection is subject to an axial load resulting from load being transferred to the secondary load path, rotating the upper secondary nut and lower secondary nut relative to one another in order to lock the threads of the secondary nuts with the screwshaft.

The method may include providing and/or using any or all features as discussed above in connection with the first aspect and optional features thereof.

The method may comprise providing a biasing mechanism disposed between the ballnut and the lower secondary nut, and using the biasing mechanism to hold the lower secondary nut in such a position that its threads are disposed centrally between the threads of the screwshaft when no axial load is applied to the lower secondary nut.

The method may comprise using the coupling between the secondary connection and the lower secondary nut to transfer an axial load to the lower secondary nut when the axial load arising from failure of the primary load path is applied to the secondary connection, this axial load acting against the force applied by the biasing mechanism and moving the threads of the lower secondary nut so that its threads are no longer disposed centrally between the threads of the screwshaft.

The method may comprise providing a coupling between one of the secondary nuts, preferably the upper secondary nut, and the secondary connection via a piston constrained within a slot and held in position in the slot by a ramp;

wherein the slot is shaped such that when the piston is able to pass the ramp then the nut and secondary connection can move rotationally relative to one another thereby locking the threads of the two nuts with the screwshaft; preferably so that the piston is held against the ramp by a resilient device, for example a spring, such that sufficient rotational force will cause the piston to pass along the ramp, depressing the resilient device and passing beyond the ramp and further along the slot to achieve the rotational movement described above. The method may include using the coupling in the step of rotating the upper secondary nut and lower secondary nut relative to one another in order to lock the threads thereof.

The method may comprise providing the slot in the surface of one of the secondary connection or the nut; preferably so that the spring and optionally a part of the piston may be held within an axial bore in the other of the secondary connection or the nut, so that the pin bridges the clearance and so that it can interact mechanically with both the secondary connection and the nut.

The method may comprise forming the slot so that it has a first portion extending in the axial direction of the screwshaft with a second portion joining at an angle to an end of the first portion, the second portion extending in a circumferential direction.

The method may comprise providing the ramp on the second portion of the slot so that it acts to keep the pin in the second portion until a sufficient rotational force is applied, at which point the pin will pass by the ramp and be free to move along the remainder of the second portion, to the angle and into the first portion.

The method may comprise providing a thrust bearing between the upper and lower secondary nuts and using the thrust bearing to enable the two nuts to bear against each other with large compressive forces and yet still rotate relative to one another in order to jam the threads.

The method may comprise providing the secondary connection with transfer plates and using the transfer plates to interact with transfer plates on the primary ballnut, for transferring loads during normal use with elements of the secondary load path rotating at the same time as the primary ballnut.

BRIEF DESCRIPTION OF DRAWINGS

An exemplary embodiment of the present invention will now be described by way of example only and with reference to the accompanying drawings in which.

DETAILED DESCRIPTION OF THE INVENTION

Figure 2:
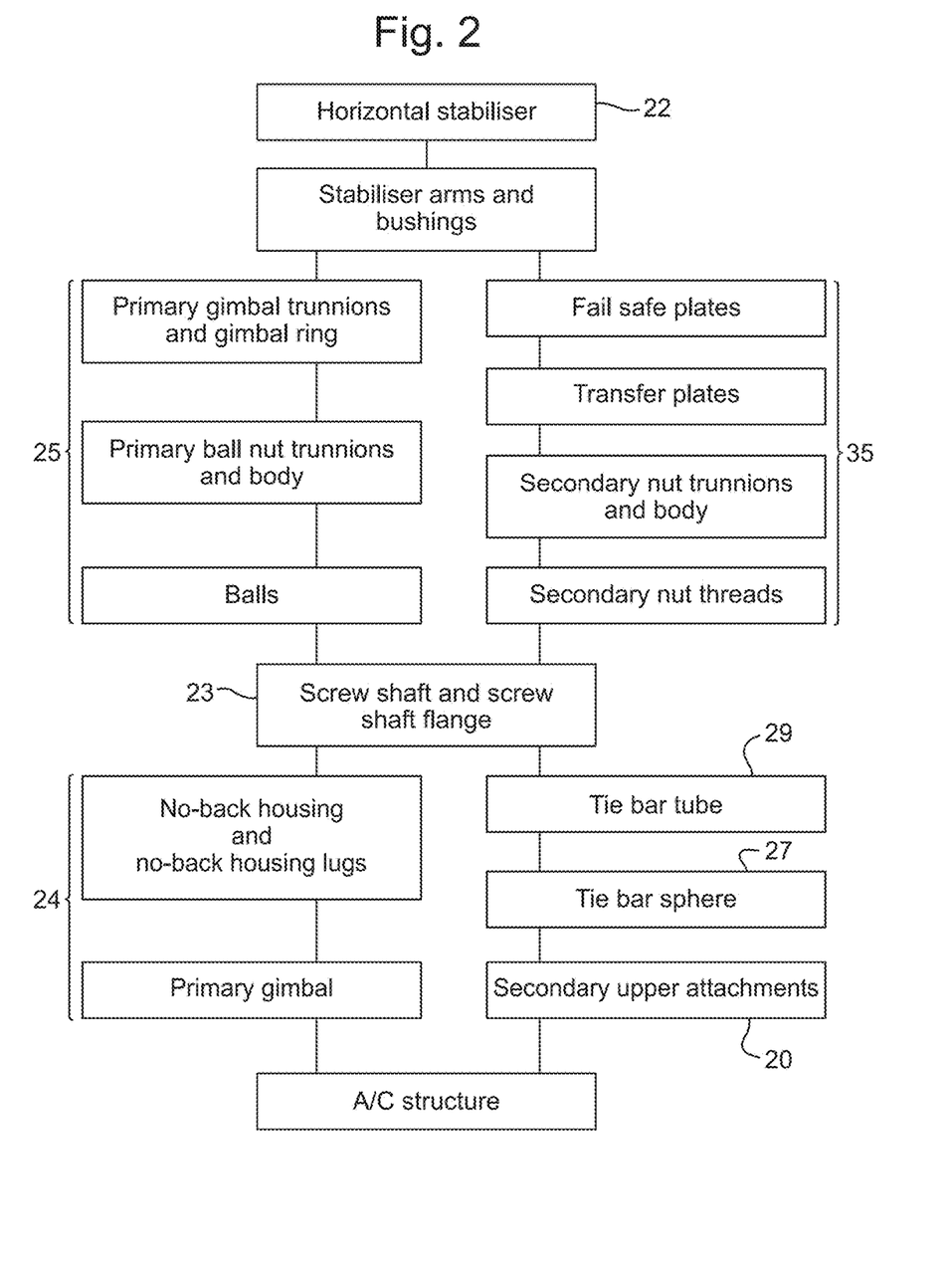
FIG. 2 illustrates a typical arrangement for primary and secondary load paths in a typical horizontal stabiliser actuator (THSA)

One possible arrangement for primary and secondary load paths in a THSA is shown in FIG. 2. A horizontal stabiliser 22 is connected by stabiliser arms and bushings to a nut assembly 25 which connects it to a screw 23. In this case the nut assembly 25 includes a gimbal assembly with primary gimble trunnions and a gimbal ring connected to primary ball nut trunnions and a ball nut body, which is coupled via balls to the screw shaft of the screw 23. The nut assembly 25 forms the lower attachment of the actuator in the primary load path. At the upper end of the actuator a joint system such as a Cardan joint system 24 will typically include no back elements along with the primary load path gimbal, which is coupled to the aircraft structure. During normal use, without any failure, the loading for the actuator is carried via the primary path.

In the event of a failure of the primary path the loading is transferred to the secondary path. In this example at the lower attachment the horizontal stabiliser 22 is connected by the stabiliser arms and the bushings to a secondary load path lower attachment 35 comprising failsafe plates and transfer plates coupled via secondary nut trunnions and a secondary nut body to secondary nut threads which are joined to the thread of the screw 23 when the secondary load path is engaged. Typically the secondary nut threads would be arranged to lock with the threads of the screw 23 preventing movement of the horizontal stabiliser 22 when the secondary load path is engaged. From the lower attachment 35 the load in the secondary load path is transmitted via the screw 23 along the tie bar tube/rod 29 through the male end of the tie bar rod, which in this example is a tie bar sphere 27, and to the secondary load path upper attachment 20.

In this situation it will be understood that the horizontal stabiliser can be rigidly connected to the screw shaft 23 and through the tie bar tube 29 to the tie bar sphere 27 which is held by the upper attachment 20, and that therefore aerodynamic loading applied to the horizontal stabiliser during flight will result in dynamic loading on the connection between the tie bar sphere and the secondary upper attachment 20. It has been realised that this can result in undesirable "flutter" potentially causing degradation in aircraft performance and even a loss of control for the pilot. Consequently, an upper attachment 20 is proposed that incorporates a system for cancellation of the backlash that is necessarily present when the secondary load path is unloaded.

Figure 3:
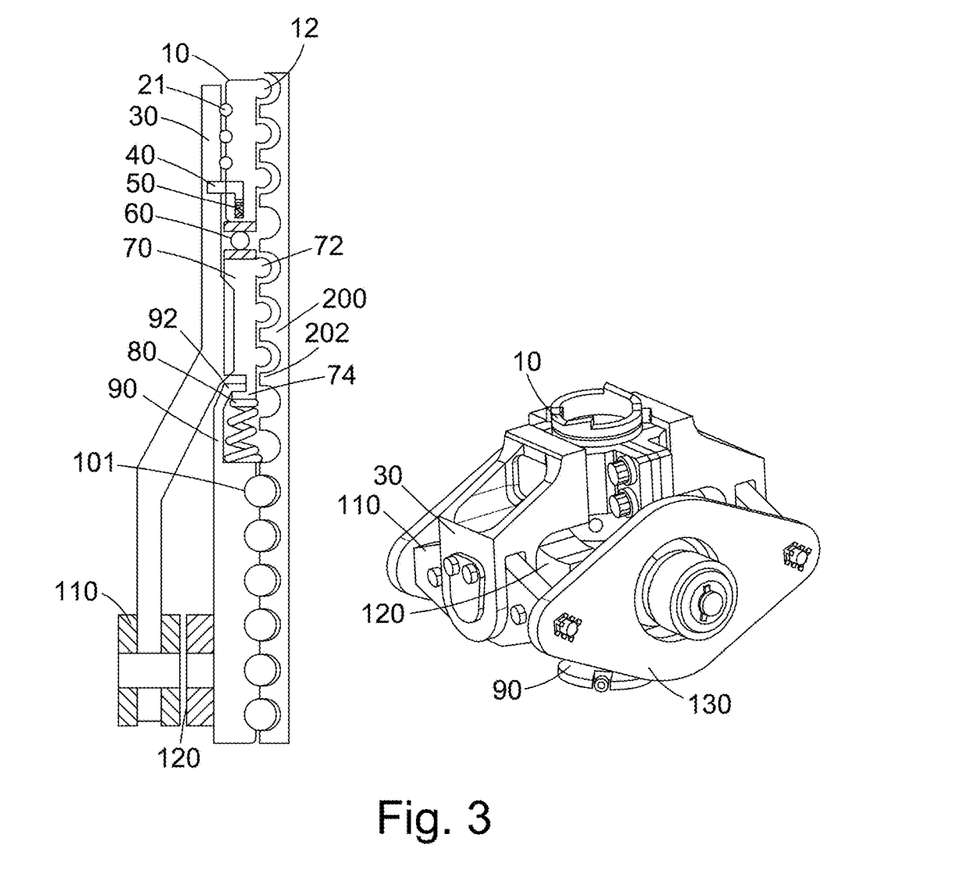
FIG. 3 shows a schematic diagram for a lower attachment for a THSA illustrating the principles of a backlash cancellation system.

FIG. 3 shows a lower attachment of a trimmable horizontal stabiliser actuator (THSA) with a backlash cancellation system. The lower attachment comprises an upper secondary nut 10, a lower secondary nut 70, a secondary connection 30, a transfer plate 110, a failsafe plate 130, a ballnut 90, a spring 80 and a thrust bearing 60. The upper secondary nut 10 is equipped with an anti-rotation device comprising a piston 40 that is actuated by a spring 50 and which moves constrained by a slot 42 defined in the surface of the secondary connection 30, and an axial bore 14 within the upper secondary nut 10. The movement of the piston 40 is discussed in more detail below with reference to FIG. 4.

The upper secondary nut 10 features on its outer diameter a ball track 21 so that it can rotate under axial loads. The ball track 21 is disposed between the upper secondary nut 10 and the secondary connection 30 to allow relative rotation therebetween. The internal threads 12 of the upper secondary nut 10 cooperate with the threads 202 of the screwshaft 200. The upper secondary nut 10 is therefore disposed between the screwshaft 200 and the secondary connection 30.

The upper secondary nut 10 is also positioned above the lower secondary nut 70 (in relation to the orientation of FIG. 3). The threads 72 of lower secondary nut 70 also cooperate with threads 202 of the screwshaft 200. The lower secondary nut 70 is also disposed between the secondary connection 30 and the screwshaft 200. The thrust bearing 60 is disposed between the upper secondary nut 10 and the lower secondary nut 70, so as to enable rotation therebetween even when the system is under significant axial loads.

The ballnut 90 is disposed below the lower secondary nut 70 and cooperates with the threads 202 of the screwshaft 200 to enclose the ball bearings 101. Therefore, rotation of the screwshaft 200 controls the position of the ballnut 90 relative to the screwshaft.

The spring 80 is disposed between the ballnut 90 and the lower secondary nut 70 and serves to bias a flange portion 74 of the lower secondary nut 70 against a fuse shoulder 92 of the ballnut 90, as seen in FIG. 3. The lower secondary nut 70 is therefore held in its normal operating position such that its threads 72 are centred between the threads 202 of the screwshaft 200.

The secondary connection 30 extends from adjacent the upper secondary nut 10 downwards, past the lower secondary nut 70, to support the transfer plate 110, which may contact the transfer plate 120 in order to transfer loads.

As noted above, the upper secondary nut 10 also includes an anti-rotation device that comprises a piston 40 actuated by a spring 50. During normal operation when the secondary load path is unloaded, this device prevents rotation of the upper secondary nut 10 relative to the secondary connection 30. This is because the piston 40 includes a pin extending between the upper secondary nut 10 and the secondary connection 30, and because the movement of the piston 40 is restrained by the shape of the slot 42. The piston 40 is attached to the spring 50 which is located within a vertical bore 14 (see FIG. 4) defined in the upper secondary nut 10. As a result the piston 40 can only move axially relative to the upper secondary nut 10 and is moveable between a lower and an upper position.

Figure 4:
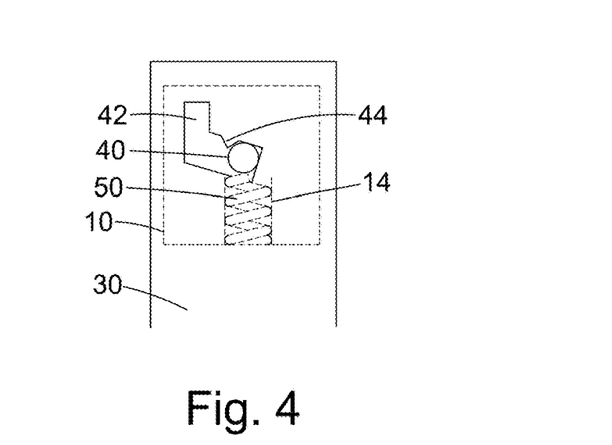
FIG. 4 shows a magnification of part of the lower attachment.

FIG. 4 shows a front-on view (rotated 90 degrees with respect to FIG. 3) of the surface of the secondary connection 30, wherein the end of the pin part of the piston 40 is seen to be located at the bottom of a slot 42 defined in the secondary connection 30. The dashed lines show the lower part of the slit 14 defined in the upper secondary nut 10 (disposed behind secondary connection 30 in this image), where the spring 50 is located. The spring 50 thus biases the piston 40 in an upward direction, but the piston 40 is prevented from moving laterally (during normal operation) by a ramp 44 defined in the slot 42 and the upward urging of the spring 50. The piston 40 therefore maintains its lower position in the slot 42.

The configuration shown in FIG. 4 is that of normal operation when the lower attachment is not locked, since the piston 40 is located in its lower position. The slot 42 in the secondary connection 30 is shaped such that once the backlash cancellation system has deployed (i.e. when the piston 40 moves to its upper position) the spring 50 will hold the piston 40 with the upper secondary nut 10 and other secondary load path components in a locked position.

When the primary load path is loaded and the secondary load path is unloaded, the disposition of the components is as shown in FIG. 3. The threads 12, 72 of the upper and lower secondary nuts 10, 70, are spaced equidistantly between the threads 202 of the screwshaft 200. The secondary nuts 10, 70 are therefore free to rotate with the ballnut 90.

However, in the event of primary load path failure and subsequent aerodynamic loading on the aircraft, the secondary connection 30 will be pulled downwards relative to the screwshaft. This will bear on the lower secondary nut 70, causing the spring 80 to compress and the lower secondary thread 70 to thus also move downwards relative to the screwshaft 200. Then, the threads 27 of the lower secondary connection 70 come into contact with the lower (tensile) sides of the threads 202 of screwshaft 200.

Once this contact is made, the load from the secondary connection 30 is partially transferred to the upper secondary nut 10, which is therefore also drawn downwards, resulting in its threads 12 contacting the threads 202 of the screwshaft 200. The screwshaft then applies a rotational load on the upper secondary nut 10.

Figure 5:
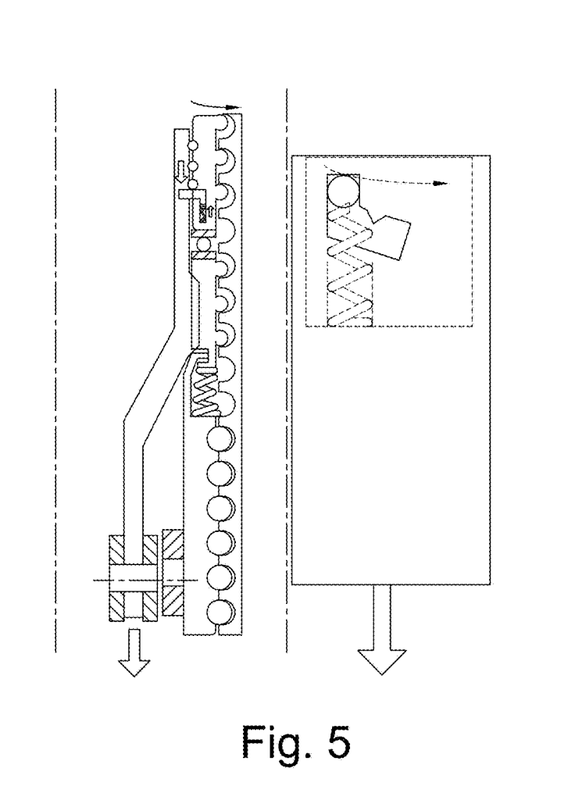
FIG. 5 shows a schematic diagram for the deployment of the backlash cancellation system of the lower attachment.

If the rotational load on the upper secondary nut 10 is sufficient, the piston 40 located in the slot 42 will be urged over the ramp 44 (via slight compression of the spring 50). The piston 40 will thus be freed to move up the incline of the slot 42, assisted by the expansion of the spring 50, and into its upper position. The resulting lateral movement of the piston 40 allows the upper secondary nut 10 to rotate relative to the secondary connection 30. This relative rotation causes the threads 12 of the upper secondary nut 10 to be urged against the upper side of the threads 202 of the screwshaft 200. This configuration is shown in FIG. 5.

The contact between the threads 12 of the upper secondary nut 10 and the threads 202 of the screwshaft, in combination with the contact between the threads 72 of the lower secondary nut 70, prevents further rotation of the secondary connection 30 relative to the screwshaft and therefore locks the lower attachment in place.

Figure 6:
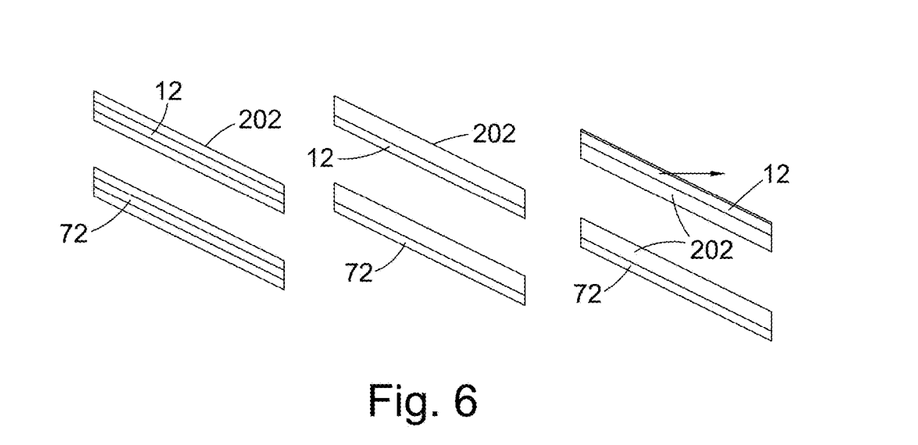
FIG. 6 shows a schematic of the steps involved in the deployment of the backlash cancellation device.

In summary, and with reference to FIG. 6, the operation of the lower attachment can be described in three stages:

when there is no load on the secondary connection 30, the threads 12, 72 of the upper and lower secondary nuts 10, 70 are centred between the flanks of the primary screw threads 202 of the screwshaft 200;

when a load is applied to the secondary connection 30, it moves downwards and the threads 12, 72 of both of the secondary nuts 10, 70 press the flanks of the tensile side of the threads 202 of the screwshaft 200;

the resulting rotational force applied to the upper secondary nut 10 urges the piston 40 over the ramp 44 defined in the slot 42 of the secondary connection 30, and the upper secondary nut 10 rotates relative to the secondary connection 30 and urges its threads 12 into contact with the compressive side of the threads 202 of the screwshaft 200.

Thus, once the lower attachment has been locked, any inversion of the load will not cause the upper secondary nut 10 to be driven back by virtue of the location of the piston 40 in the locking position of the slot 42.

The presence of the thrust bearing 60 between the upper secondary nut 10 and the lower secondary nut 70 allows the upper secondary nut 10 to rotate—and hence the system to operate—even under significant axial loading.

The methods and systems described herein and shown in the drawings provide a lower attachment for a trimmable horizontal stabiliser actuator that improves reliability of operation and the cancellation of backlash. While the apparatus and methods herein have been shown and described with reference to exemplary embodiments, those skilled in the art will appreciate that changes and/or modifications may be made thereto without departing from the scope of the present invention as defined by the appended claims.

The invention claimed is:

1. A lower attachment system for a trimmable horizontal stabiliser actuator comprising:
a screwshaft forming a part of or coupled to a main screw of the actuator, the screwshaft having an axial direction;

a primary ballnut disposed on the screwshaft and forming a part of a primary load path of the lower attachment system;

a lower secondary nut disposed on the screwshaft axially adjacent the primary ballnut;

an upper secondary nut disposed on the screwshaft adjacent the lower secondary nut and on the opposite side thereof to the primary ballnut; and a secondary connection arranged for axial and rotational movement and coupled to each of the lower secondary nut and the upper secondary nut;

wherein the secondary connection is arranged to be loaded when the secondary load path is loaded and the secondary load path also includes the upper and lower secondary nuts; and wherein the couplings between the secondary connection and the upper and lower secondary nuts are arranged such that during normal use, when the primary ballnut transmits the loading of the actuator along the primary load path, then there is no relative rotational movement of the secondary connection, the upper secondary nut and the lower secondary nut, and such that when the secondary connection is subject to an axial load resulting from load being transferred to the secondary load path, the upper secondary nut and lower secondary nut are compelled to rotate relative to one another thereby locking the threads of the secondary nuts with the screwshaft;

wherein one of the secondary nuts is coupled to the secondary connection via an anti-rotation device having a portion thereof constrained within a slot and that is held in position in the slot by a ramp;

wherein the slot is shaped such that when the portion of the anti-rotation device is able to pass the ramp then the secondary nut and the secondary connection can move rotationally relative to one another thereby locking the threads of the two nuts with the screwshaft wherein the portion of the anti-rotation device is held against the ramp by a resilient device such that sufficient rotational force between the secondary nut and the secondary connection will cause the portion of the anti-rotation device to pass along the ramp, depressing the resilient device and passing beyond the ramp and further along the slot to achieve the relative rotational movement of the upper and lower secondary nuts.

2. A lower attachment system as claimed in claim 1, wherein the anti-rotation device prevents relative rotational movement when no axial load is applied to the secondary connection, but which permits relative rotational movement when an axial load above a threshold level is applied to the secondary connection.

3. A lower attachment system as claimed in claim 1, wherein the slot is formed in the surface of one of the secondary connection or the upper secondary nut; and wherein the resilient device is held within an axial bore in the other of the secondary connection or the secondary upper secondary nut.

4. A lower attachment system as claimed in claim 3, wherein the portion of the anti-rotation device is a pin and wherein the slot has a first portion extending in the axial direction of the screwshaft and a second portion joining at an angle to an end of the first portion, the second portion extending in a circumferential direction, and wherein the ramp is formed on the second portion and acts to keep a pin of the anti-rotation device the pin in the second portion until a sufficient rotational force is applied to cause the pin to pass by the ramp and to move along the remainder of the second portion, to the angle and into the first portion.

5. A lower attachment system as claimed in claim 1, wherein only one of the upper secondary nut and the lower secondary nut moves rotationally relative to the secondary connection.

6. A lower attachment system as claimed in claim 1, wherein the system comprises a biasing mechanism disposed between the ballnut and the lower secondary nut; and
wherein the biasing mechanism is arranged to hold the lower secondary nut in such a position that its threads are disposed centrally between the threads of the screwshaft when no axial load is applied to the lower secondary nut.

7. A lower attachment system as claimed in claim 6, wherein, when the axial load arising from failure of the primary load path is applied to the secondary connection, the coupling between the secondary connection and the lower secondary nut transfers an axial load to the lower secondary nut, this axial load acting against the force applied by the biasing mechanism and hence moving the threads of the lower secondary nut so that its threads are no longer disposed centrally between the threads of the screwshaft such that the threads of the lower secondary nut bear on the screwshaft threads when the axial load is transferred from the secondary connection.

8. A lower attachment system as claimed in claim 6, the system comprising a thrust bearing between the upper and lower secondary nuts.

9. A method of using a lower attachment system for a trimmable horizontal stabiliser actuator to avoid backlash in a secondary load path, the lower attachment comprising:
a screwshaft forming a part of or coupled to a main screw of the actuator, the screwshaft having an axial direction;
a primary ballnut disposed on the screwshaft and forming a part of a primary load path of the lower attachment system;
a lower secondary nut disposed on the screwshaft axially adjacent the primary ballnut;
an upper secondary nut disposed on the screwshaft adjacent the lower secondary nut and on the opposite side thereof to the primary ballnut; and
a secondary connection coupled to each of the lower secondary nut and the upper secondary nut;
the method comprising:
arranging the secondary connection for axial and rotational movement;
arranging the secondary connection to be loaded when the secondary load path is loaded, wherein the secondary load path also includes the upper and lower secondary nuts;
arranging the couplings between the secondary connection and the upper and lower secondary nuts such that during normal use, when the primary ballnut transmits the loading of the actuator along the primary load path, then there is no relative rotational movement of the secondary connection, the upper secondary nut and the lower secondary nut;
when the secondary connection is subject to an axial load resulting from load being transferred to the secondary load path, rotating the upper secondary nut and lower secondary nut relative to one another in order to lock the threads of the secondary nuts with the screwshaft; and
providing a biasing mechanism disposed between the ballnut and the lower secondary nut, and using the biasing mechanism to hold the lower secondary nut in such a position that its threads are disposed centrally between the threads of the screwshaft when no axial load is applied to the lower secondary nut.

10. A method as claimed in claim 9, comprising using the coupling between the secondary connection and the lower secondary nut to transfer an axial load to the lower secondary nut when the axial load arising from failure of the primary load path is applied to the secondary connection, this axial load acting against the force applied by the biasing mechanism and moving the threads of the lower secondary nut so that its threads are no longer disposed centrally between the threads of the screwshaft.

11. A method of using a lower attachment system for a trimmable horizontal stabiliser actuator to avoid backlash in a secondary load path, the lower attachment comprising:
   a screwshaft forming a part of or coupled to a main screw of the actuator, the screwshaft having an axial direction;
   a primary ballnut disposed on the screwshaft and forming a part of a primary load path of the lower attachment system;
   a lower secondary nut disposed on the screwshaft axially adjacent the primary ballnut;
   an upper secondary nut disposed on the screwshaft adjacent the lower secondary nut and on the opposite side thereof to the primary ballnut; and
   a secondary connection coupled to each of the lower secondary nut and the upper secondary nut;
   the method comprising:
   arranging the secondary connection for axial and rotational movement;
   arranging the secondary connection to be loaded when the secondary load path is loaded, wherein the secondary load path also includes the upper and lower secondary nuts;
   arranging the couplings between the secondary connection and the upper and lower secondary nuts such that during normal use, when the primary ballnut transmits the loading of the actuator along the primary load path, then there is no relative rotational movement of the secondary connection, the upper secondary nut and the lower secondary nut;

when the secondary connection is subject to an axial load resulting from load being transferred to the secondary load path, rotating the upper secondary nut and lower secondary nut relative to one another in order to lock the threads of the secondary nuts with the screwshaft; and providing a coupling between one of the secondary nuts and the secondary connection via a pin constrained within a slot and held in position in the slot by a ramp;

wherein the slot is shaped such that when the pin is able to pass the ramp then the nut and secondary connection can move rotationally relative to one another thereby locking the threads of the two nuts with the screwshaft; wherein the method comprises:

holding the pin against the ramp by a resilient device such that sufficient rotational force will cause the pin to pass along the ramp, depressing the resilient device and passing beyond the ramp and further along the slot to achieve the rotational movement;

forming the slot so that it has a first portion extending in the axial direction of the screwshaft with a second portion joining at an angle to an end of the first portion, the second portion extending in a circumferential direction, and providing the ramp on the second portion of the slot so that it acts to keep the pin in the second portion until a sufficient rotational force is applied, at which point the pin will pass by the ramp and be free to move along the remainder of the second portion, to the angle and into the first portion.

* * * * *